United States Patent

[11] 3,619,648

[72] Inventor Jörg Wolber
Hamburg, Germany

[21] Appl. No. 867,764
[22] Filed Oct. 20, 1969
[45] Patented Nov. 9, 1971
[73] Assignee U.S. Philips Corporation
New York, N.Y.

[54] CIRCUIT ARRANGEMENT FOR RESTORING THE DIRECT-CURRENT COMPONENT BY THE CONTROL OF A REFERENCE VALUE
4 Claims, 1 Drawing Fig.

[52] U.S. Cl. .......... 307/237, 178/7.5 DC, 330/95
[51] Int. Cl. .......... H03k 5/08
[50] Field of Search .......... 307/237; 330/95; 178/7.5 DC, 7.3 DC

[56] References Cited

UNITED STATES PATENTS

| | | | |
|---|---|---|---|
| 3,205,448 | 9/1965 | Bahrs .......... | 307/237 |
| 3,514,638 | 5/1970 | Blauert .......... | 307/237 |

*Primary Examiner*—Donald D. Forrer
*Assistant Examiner*—David M. Carter
*Attorney*—Frank R. Trifari

ABSTRACT: A clamping circuit for video signals features a DC amplifier having an output coupled to a diode to which a sampling signal is applied. Another diode is coupled to the first diode and to a control input of the amplifier to maintain constant clamping.

PATENTED NOV 9 1971 3,619,648
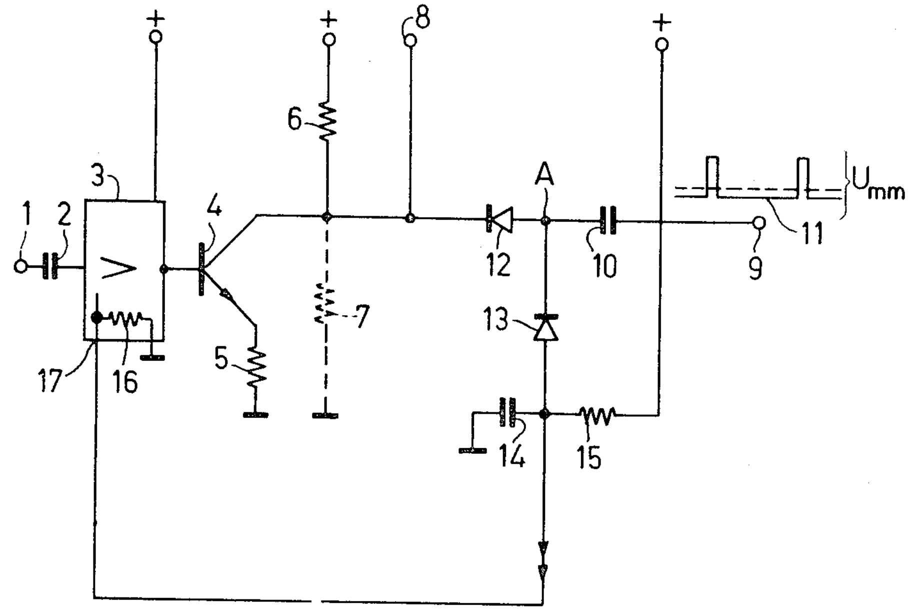
INVENTOR.
JORG WOLBER
BY
Frank R. Trifari
AGENT

CIRCUIT ARRANGEMENT FOR RESTORING THE DIRECT-CURRENT COMPONENT BY THE CONTROL OF A REFERENCE VALUE

The invention relates to a clamping control-circuit arrangement in which an output of a direct-current coupled amplifier is connected through the series combination of at least a diode and a capacitor to a pulse voltage source, while the diode-capacitor connection is coupled through an impedance with a direct-voltage input of the amplifier shunted by at least a smoothing capacitor.

In such a circuit arrangement known from Radio Mentor, Feb. 2, 1967, pages 105 to 107 a pulse signal sampling a reference value and usually having a considerable amplitude has to be kept away from the control-circuit by means of a smoothing member consisting of a series resistor and a shunt capacitor. By means of a capacitor of suitable value adequate filtering can be obtained, if the resistor is chosen with sufficiently high value. Particularly in a circuit having not only a control-voltage but also a control-current, for example, including transistors, a voltage drop of the control-magnitude occurs across the series resistor so that the control-steepness is reduced. This becomes manifest in insufficient stabilization of the black level value and hence in an appreciable black value deficiency. Moreover, a large series resistor increases the control-time constant. These undesirable effects may be avoided by using a smaller series resistor; then the capacitor included in the shunt branch has to be accordingly larger. A large (electrolytic) capacitor, however, involves not only higher costs but also exhibits a marked leakage current such that the control-effect is again reduced.

In a circuit-arrangement of the kind set forth these disadvantages are avoided and a satisfactory black level value, which responds sufficiently rapidly is obtained, if in accordance with the invention said impedance is formed by a diode circuit whose sense of conduction with respect to said connection between the first-mentioned diode and the capacitor is opposite the direction of conduction of said first-mentioned diode.

The invention will be described more fully with reference to the drawing in which an example of clamping control circuit according to the invention is illustrated with a schematic diagram.

A conventional television signal in which the direct-current component has got lost, for example, due to capacitor coupling, for example a color television signal obtained by combination from the brightness signal and the color difference signal is applied from an input terminal 1 through a separation capacitor 2 to an amplifier 3, which also is able to amplify a DC component. An output of the amplifier controls an NPN-type transistor 4 by its base. The emitter of the transistor 4 is connected to earth via a resistor 5 of 100 ohms and the collector is connected via a resistor 6 of about 4.5 kohms to a supply voltage + which is positive to earth. Particularly when the latter has a high value it may be efficient to form a voltage divider by a resistor connected between collector and earth: when the resistor 6 has a value of 5.6 kohms and the resistor 7 has a value of 22 kohms approximately the same effective collector impedance is obtained.

The signal amplified by the collector and stabilized on a constant black level by the arrangement to be described hereinafter can be derived from a terminal 8.

From a terminal 9, via a separation capacitor 10 of about 1000 pF positive sampling pulses 11 of a peak value of some hundred volts are applied. Thus a diode 12 connected between the capacitor 10 and the collector of the transistor 4 becomes conducting so that the capacitor is charged to the value of the voltage difference between the pulse peak and the reference level at the collector of the transistor 4 at the sampling instant. For a perfect operation it may be effective to limit accurately the pulses to a defined amplitude value, for example, by means of a threshold circuit. Beyond the positive-going parts of the pulse voltage 11 the diode 12 is cut off and at the junction A of the capacitor 10 and the diode 12 appears a voltage which is negative going and is more negative by the pulse voltage peak value $U_{mm}$ than the voltage of the sampled reference level of the collector voltage. This negative-going voltage opens a diode 13 and is transmitted to an earth-connected capacitor 14. The resultant control-voltage having in practical operation a value of a few volts is applied to a direct-voltage input of the amplifier 3 for adjusting the working point.

When the reference level at the collector of the transistor 4 becomes more negative (less positive), the voltage at the junction A also becomes more negative beyond the sampling intervals; the change of the capacitor 14 correspondingly is changed via the diode 13 and the amplifier 3 is connected so that a more negative control-voltage controls the base of the transistor 4 in a more negative sense so that the collector current decreases and the collector voltage becomes more positive.

Since the control-voltage for the amplifier 3 should have an absolute value, a positive current of the order of 10$\mu$A to 20$\mu$A is supplied to the capacitor 14 from the supply source via a large resistor 15 of a few hundred kohms. The capacitor voltage therefrom increases steadily and is adjusted by the effect of the sampling circuit to the low positive value associated in the manner described with the collector voltage of the transistor 4.

The time constant of the adjustment to said value via the conducting diode 13 is defined essentially by the internal resistance of the sampling pulse source and the impedance at the junction 8 and the value of the capacitor 14. In the known arrangement in which instead of the diode 13 a large series resistor is connected, the change of the charge also depends upon the value of this series resistor and, as the case may be, on the value of the resistor 16 operative at the control-voltage input of the amplifier 3 relative to earth or at a different point of the supply source. This time constant is therefore considerably shorter in accordance with the invention.

When the reference level at the collector of the transistor 4 becomes more positive, also the voltage at the junction A becomes more positive beyond the sampling intervals so that the diode 13 is no longer opened with respect to the more negative voltage of the capacitor 14. Then the resistor 15 is traversed by a more positive current supplied to the capacitor 14 until the diode 13 is again opened and prevents the capacitor voltage from rising further. The time constant in this control-sense is defined by the capacitor 14 and the charging resistor 15 and particularly by the control-conductor input resistance 16 of the amplifier 3, which resistance has in general a low value as compared with the resistor 15. The considerably higher cutoff resistance of the diode 13 may be neglected in this respect.

Since in accordance with the invention the control-voltage obtained by sampling at the junction A is transmitted substantially without loss to the capacitor 14 and the control-conductor, an optimum fixation of the black level of the television signal appearing at the terminal 8 is obtained.

As a matter of course, a series combination of a plurality of diodes may be employed instead of the diodes 12 and 13.

What is claimed is:

1. A circuit comprising a direct-current amplifier having a signal input means for receiving a signal to be clamped, a direct-current input, and an output; a first diode having a first electrode coupled to said output and a second electrode; a first capacitor means coupled to said second electrode for applying a sampling signal thereto; a second diode having a first electrode coupled to said first diode second electrode and being opposite in kind thereof and a second electrode coupled to said direct-current input; and a second capacitor coupled to said direct-current input and ground; whereby the output signal is clamped at a selected potential.

2. A circuit as claimed in claim 1 further comprising a resistor means coupled to said second diode second electrode for applying a potential to said second capacitor opposite in polarity from that applied thereto by said second diode.

3. A circuit as claimed in claim 1 wherein said amplifier comprises a transistor amplifier.

4. A circuit as claimed in claim 3 further comprising a potential divider coupled to said transistor.